United States Patent
Rosato

(10) Patent No.: US 11,366,330 B2
(45) Date of Patent: Jun. 21, 2022

(54) MULTI-USE KALEIDOSCOPES AND RELATED METHODS

(71) Applicant: Allan Rosato, Orcas, WA (US)

(72) Inventor: Allan Rosato, Orcas, WA (US)

(*) Notice: Subject to any disclaimer, the term of this patent is extended or adjusted under 35 U.S.C. 154(b) by 117 days.

(21) Appl. No.: 16/983,372

(22) Filed: Aug. 3, 2020

(65) Prior Publication Data

US 2021/0033875 A1  Feb. 4, 2021

Related U.S. Application Data

(60) Provisional application No. 62/882,385, filed on Aug. 2, 2019.

(51) Int. Cl.
  *G02B 27/08* (2006.01)
  *H04N 5/225* (2006.01)

(52) U.S. Cl.
  CPC ......... *G02B 27/08* (2013.01); *H04N 5/2254* (2013.01)

(58) Field of Classification Search
  None
  See application file for complete search history.

(56) References Cited

U.S. PATENT DOCUMENTS

| | | | | |
|---|---|---|---|---|
| 3,066,571 A * | 12/1962 | Shaffer | ................. | G02B 27/08 359/616 |
| 4,815,801 A * | 3/1989 | Anderson | ............. | G02B 27/08 359/616 |
| 6,062,698 A | 5/2000 | Lykens | | |
| 7,399,083 B2 | 7/2008 | Bailey et al. | | |
| 2011/0267773 A1* | 11/2011 | Macfarlane | .......... | G06F 1/1632 361/679.55 |
| 2016/0142522 A1* | 5/2016 | Kim | ...................... | A45C 11/00 455/575.8 |

FOREIGN PATENT DOCUMENTS

| | | | |
|---|---|---|---|
| JP | 3156824 U | * | 1/2010 |
| JP | 2011242735 A | * | 12/2011 |

* cited by examiner

*Primary Examiner* — Leon W Rhodes, Jr.
(74) *Attorney, Agent, or Firm* — Bretton L. Crockett; TechLaw Ventures, PLLC

(57) ABSTRACT

Multiuse devices and systems for warping images for viewing, as well as related methods. In one illustrative embodiment, such a system or device may include a body comprising a tube and a slot structure, configured for supporting a portable electronic device. The tube may include a first front viewing end and a second image source end, which are connected by a bore stretching the length of the tube. The inner surface of the bore may be formed as a reflective surface. The slot structure may include a shelf and a backing member that define the slot. In some illustrative embodiments, the system may include a mechanism for securing a mobile device in the slot to serve as an image source or as a video recording device.

20 Claims, 17 Drawing Sheets

MULTI-USE KALEIDOSCOPES AND RELATED METHODS

CROSS-REFERENCE TO RELATED APPLICATION

This application claims the benefit of U.S. Provisional Application No. 62/882,385, filed Aug. 2, 2019, which is incorporated herein by reference in its entirety, including but not limited to those portions that specifically appear hereinafter.

TECHNICAL FIELD

This disclosure generally relates to devices used to warp images into new and unique forms to be viewed by an observer by using a plurality of reflective surfaces contained within the particular geometry of the device.

BACKGROUND

A variety of devices are known which warp images into new and unique forms, such as kaleidoscopes, cameras, computer programs/apps or even carnival mirrors. These devices take an image, either built in or found in front of the device and display alterations to provide a warped version of the original image.

Although there are numerous devices and methods of warping images, improvements and innovations are still being sought to create new methods of distorting images for a number of purposes, including but not limited to use for commercialization, entertainment, creativity or curiosity.

A device that has the ability to create distorted images from multiple sources of original images would be an improvement in the art. A device that supported easy user recording of warped images for sharing would be a further improvement in the art.

SUMMARY

The present disclosure is direct to multiuse devices and systems for warping images for viewing as well as related methods. In one illustrative embodiment, such a system or device may include a body comprising a tube and a slot structure, configured for supporting a portable electronic device. The tube may include a first front viewing end and a second image source end, which are connected by a bore stretching the length of the tube. The inner surface of the bore may be formed as a reflective surface. The slot structure may include a shelf and a backing member that define the slot. In some illustrative embodiments, the system may include a mechanism for securing a mobile device in the slot to serve as an image source or as a video recording device. In some embodiments, the viewing end and image source end may be interchangeable to allow for the recording of the distorted view screen images produced by the system.

DESCRIPTION OF THE DRAWINGS

The drawings are meant for illustrative purposes in understanding the concepts behind the present disclosure and are not intended to be a comprehensive description.

DETAILED DESCRIPTION

Figure 1:
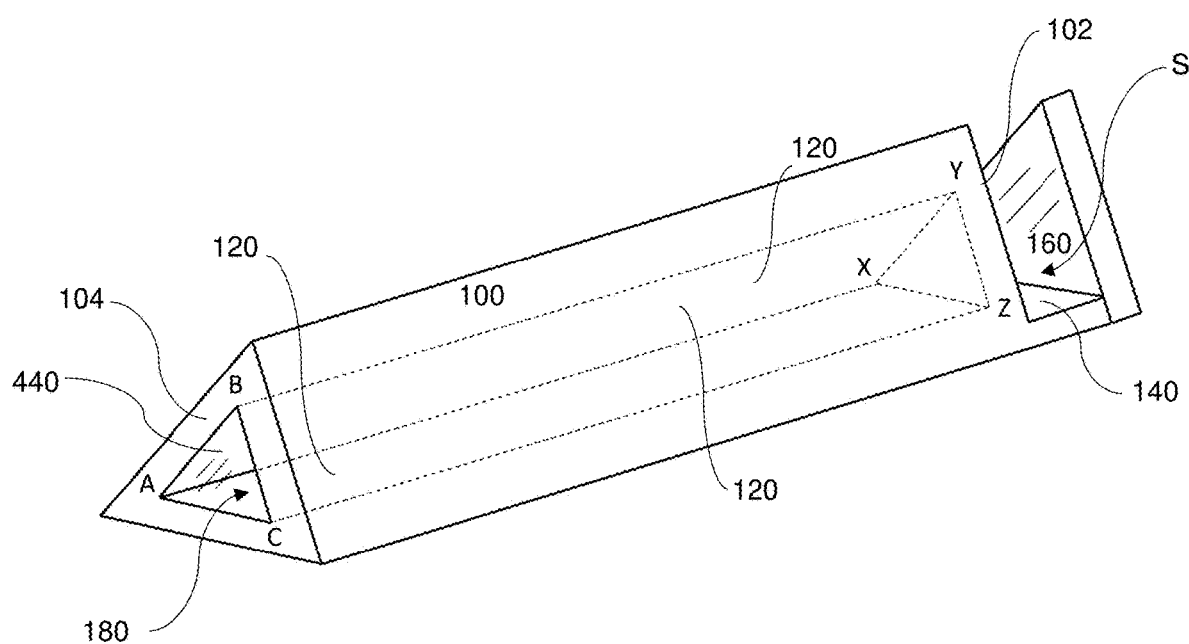
FIG. 1 illustrates a perspective view of a first illustrative embodiment of a multiuse kaleidoscope system in accordance with the teachings of the present disclosure.

For the purposes of understanding the principles in accordance with the disclosure, reference will be made to the embodiments illustrated in the drawings. It will be understood that no limitation of the scope is intended thereby as the drawings do not disclose all possible embodiments or combinations of embodiments that can be used through the teachings of this disclosure. Any alterations and further modifications of the inventive features illustrated in this disclosure and any additional applications of the teachings found in this disclosure which would normally occur to one skilled in the relevant art and possessing this disclosure are to be considered to be within the scope of the disclosure.

To better understand the principles taught in this disclosure, reference will be made to the embodiments illustrated in the drawings. One illustrative example of a kaleidoscope system 100 in accordance with the may generally be formed as a body 102 being formed as a tube with a first end 104, and an opposite second end 102, and a tubular bore 180 that extends there between. The interior surfaces 120 of the bore 180 may be reflective. The reflective surfaces 120 may be formed by lining an inner sidewall of the bore 180 with a reflective material. It will be appreciated that the reflective surfaces 120 may be formed from any suitable reflective material. Some illustrative examples include, glass or plastic mirrors, metal foils, and the like. As discussed further herein, the reflective surfaces 120 may be planar or non-planar to influence distortion of the original image. Reflective materials that alter the color of the image may be used. The bore 180 may have a cross-sectional shape selected to provide a desired warping effect. Some suitable cross sectional-shapes may include geometric shapes comprising but not limited to a triangular tubes, rectangular tubes, and cylindrical tubes. In the exemplary embodiment of FIG. 1, the reflective surfaces 120 are located within a bore 180 of the kaleidoscope 100 between points A, B, C and X, Y, Z.

As depicted, the kaleidoscope system 100 may also include a first transparent viewer 440 disposed at the first end and a second transparent viewer 446 disposed at the second end of the tube, each serving as a cover over an open end of the bore 180. Where present, the transparent viewer 440 may be formed from a suitable transparent or translucent material, including but not limited to glass, acrylic, or resin through which an observer can watch an image become distorted. It will be appreciated that embodiments including a transparent viewer 440, and a counterpart which would seal the tube and reduce the need to clean the interior.

At the second end of the bore 180, the kaleidoscope system may include a slot S for insertion of an image source. As depicted, the slot S may include a floor or a shelf 140 and a backing member 160. The slot may be sized to have a suitable width to allow a portable electronic device, such a smartphone, tablet computer or handheld gaming device inserted therein to serve as an image source. The open sides of slot S may allow such device to extend past the width of the system 100. Backing member 160 may be constructed to allowing viewing therethrough when no image source is present in slot S. For example, backing member 160 may be formed from a transparent material such as glass or acrylic, or as a loop of material that with an opening larger than the diameter of bore 180, to allow the observer to use the kaleidoscope 100 to view the environment around the observer through backing member 160 in the absence of a mobile device 720.

Figure 2:
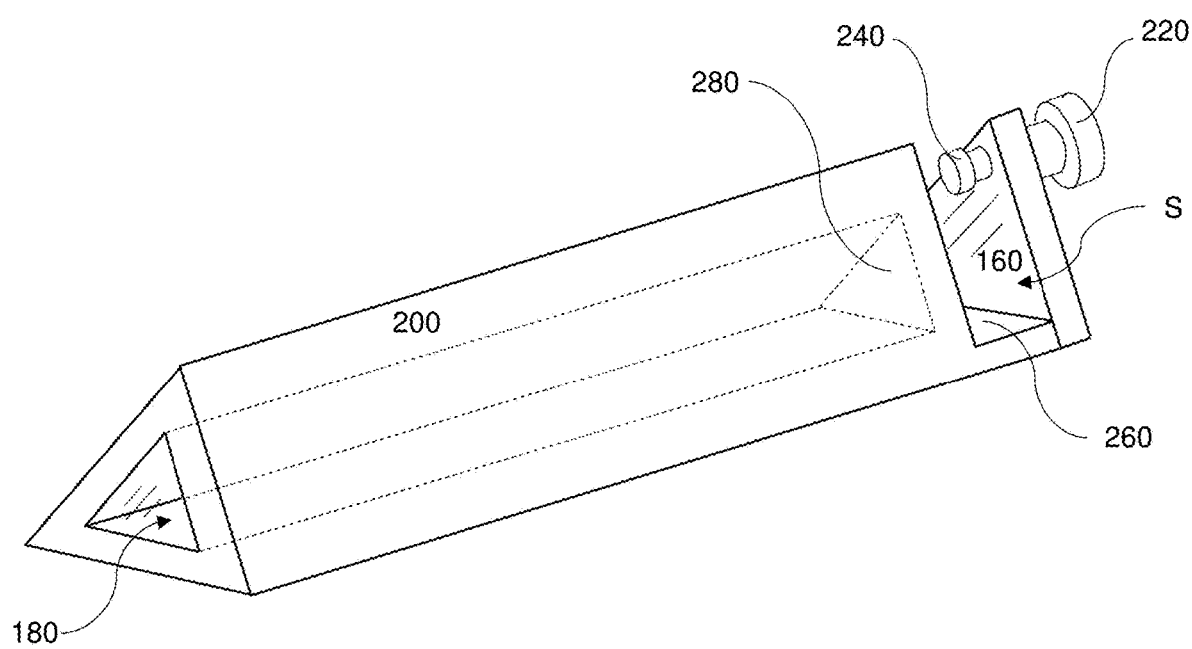
FIG. 2 illustrates a perspective view of a second illustrative embodiment of a kaleidoscope system in accordance with the teachings of the present disclosure.
Figure 3A:
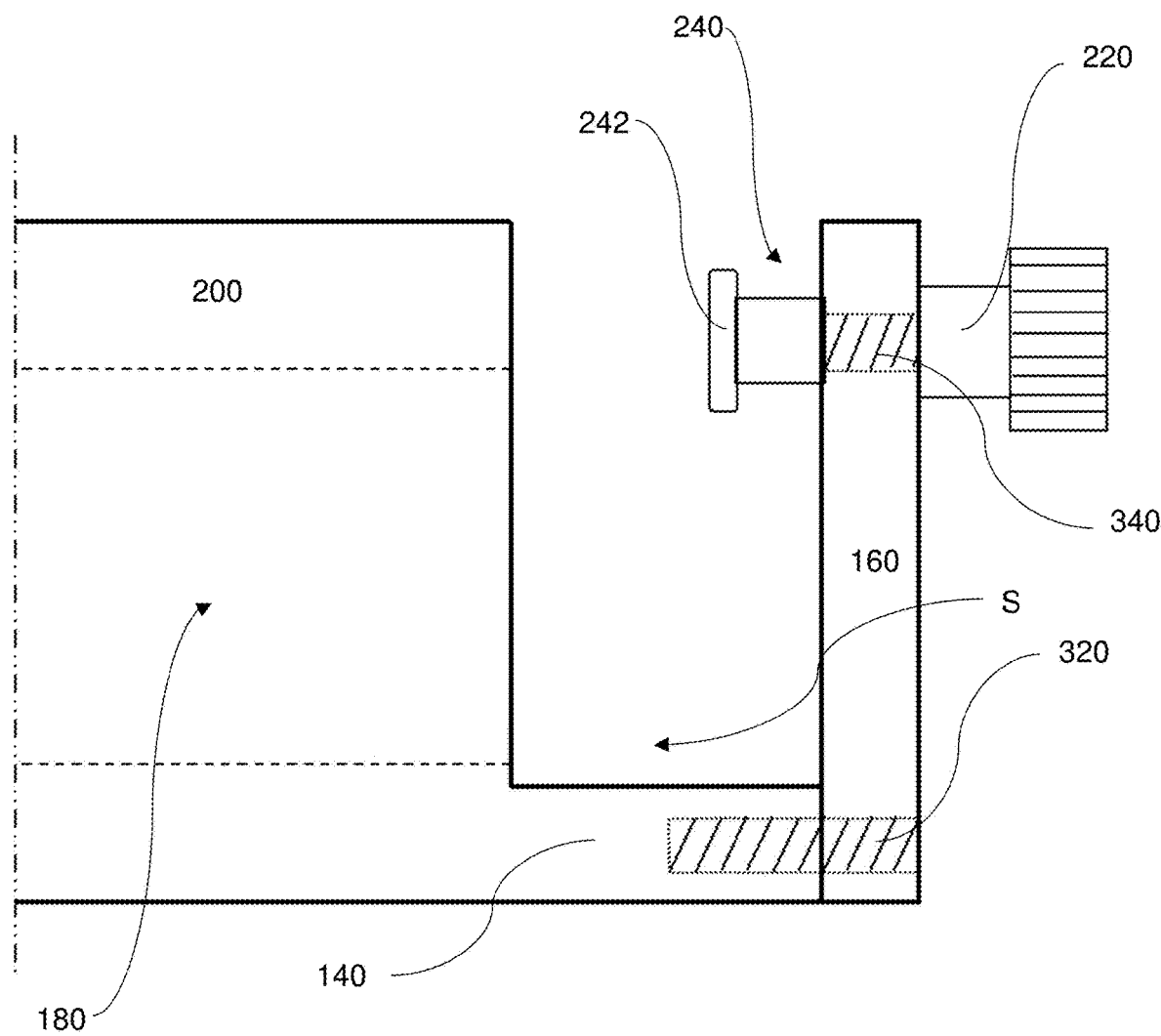
FIG. 3A illustrates a side view of the distal end of the kaleidoscope system of FIG. 2.

A clamping mechanism may be present for securing an image source in the slot S. As depicted in FIGS. 2 and 3A, one exemplary system 200 may include an illustrative clamping mechanism, generally indicated at 240, formed as a clamp with a securing member 242 for contacting the image source, which may be disposed on an extending threaded shaft 340 passing through the backing member 160, and a knob 220, that allows the clamping mechanism 240 to be advanced to secure a mobile device 720 in the slot S seated on shelf 140.

It will be appreciated that backing member 160 can be secured to the shelf 140 of the kaleidoscope system 100 or 200 by the use of any suitable fastener method. As depicted, a bore 320 in which a screw or bolt can fasten the backing member 160 into the shelf 140 may be used. Suitable adhesives, or other fasteners, or suitable combination thereof may be to attach the backing member 160 to the shelf 140. Embodiments where the shelf 140 and backing member 160 are formed as a unitary member, which may be attached to the body of the system 100 or formed continually therewith are also contemplated. Removal of the screw or bolt from the bore allows a user to visualize through the transparent or translucent backing member 160 when no mobile device is present in the slot. It will be appreciated that the backing member may be constructed from a material that is sufficiently transparent to allow a user to visualize images therethrough.

Figure 3B:
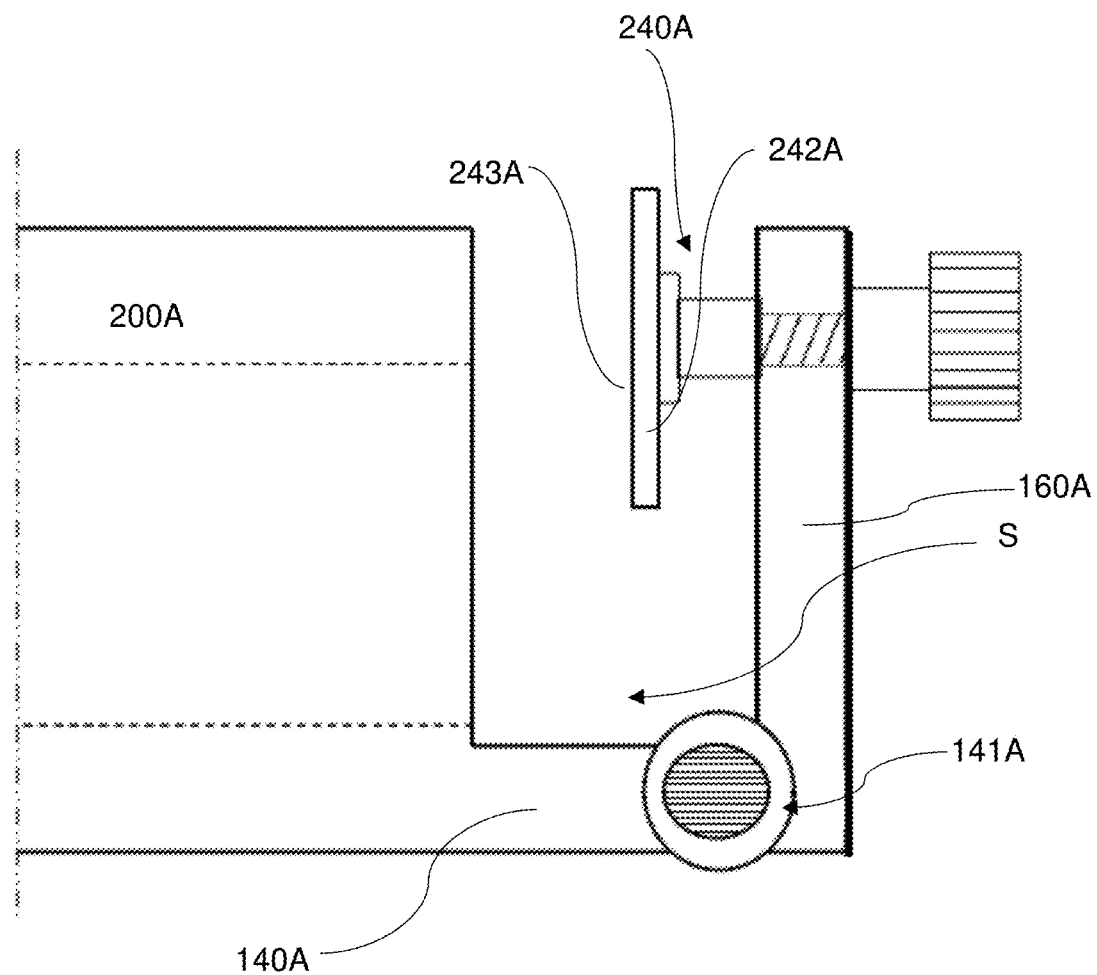
FIG. 3B illustrates a side view of the distal end of a kaleidoscope system similar to that of FIGS. 2 and 3A with an alternative securing member.
Figure 3C:
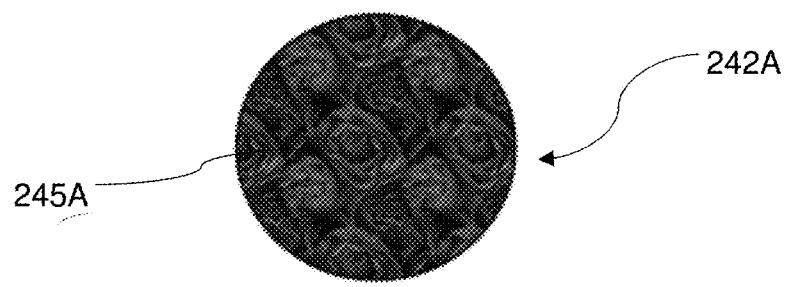
FIG. 3C is a front view of a portion of the securing member of FIG. 3B
Figure 4:
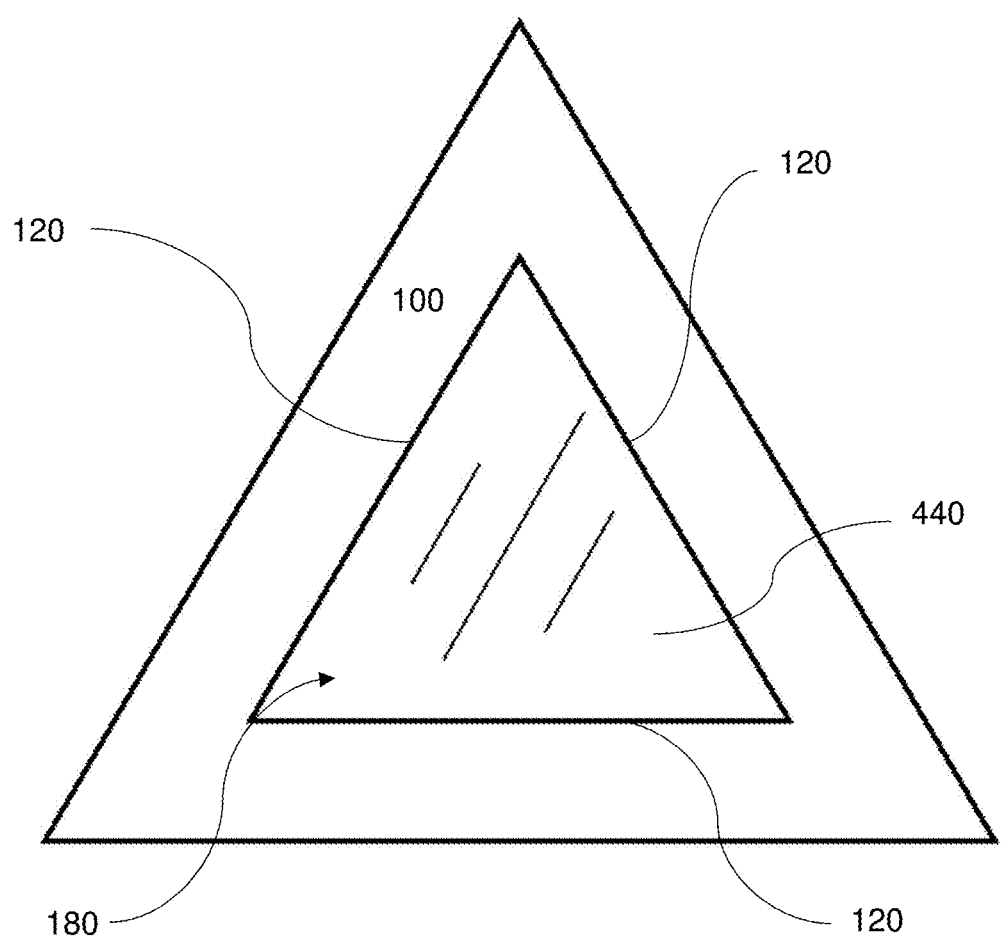
FIG. 4 illustrates a front view of a kaleidoscope system, similar to those of FIG. 1 or FIG. 2.

FIGS. 3B and 3C depict another embodiment of a clamping mechanism, which in addition to securing an image source in the slot S can function as an image source. As depicted, system 200A may include an illustrative clamping mechanism, generally indicated at 240A, formed as a clamp with a securing member 242A for contacting the image source, which features an enlarged planar front surface 243A for containing an image 245A. Enlarged member 242A may be magnetically attached to the remainder of the securing clamp, which could be identical to that of FIG. 3A and may be one of a number of changeable securing members that each bear a different image. The image 245A may be rotated by turning the threaded shaft 340.

It is additionally noted that the backing member 160A may be pivotally attached to the shelf 140A as by pivot assembly as indicated generally at 141A, which may include an axle and a locking member, or other structures to allow the backing member to be rotated downward to open slot S to further increase the options for visualization through the system 200A.

Figure 5:
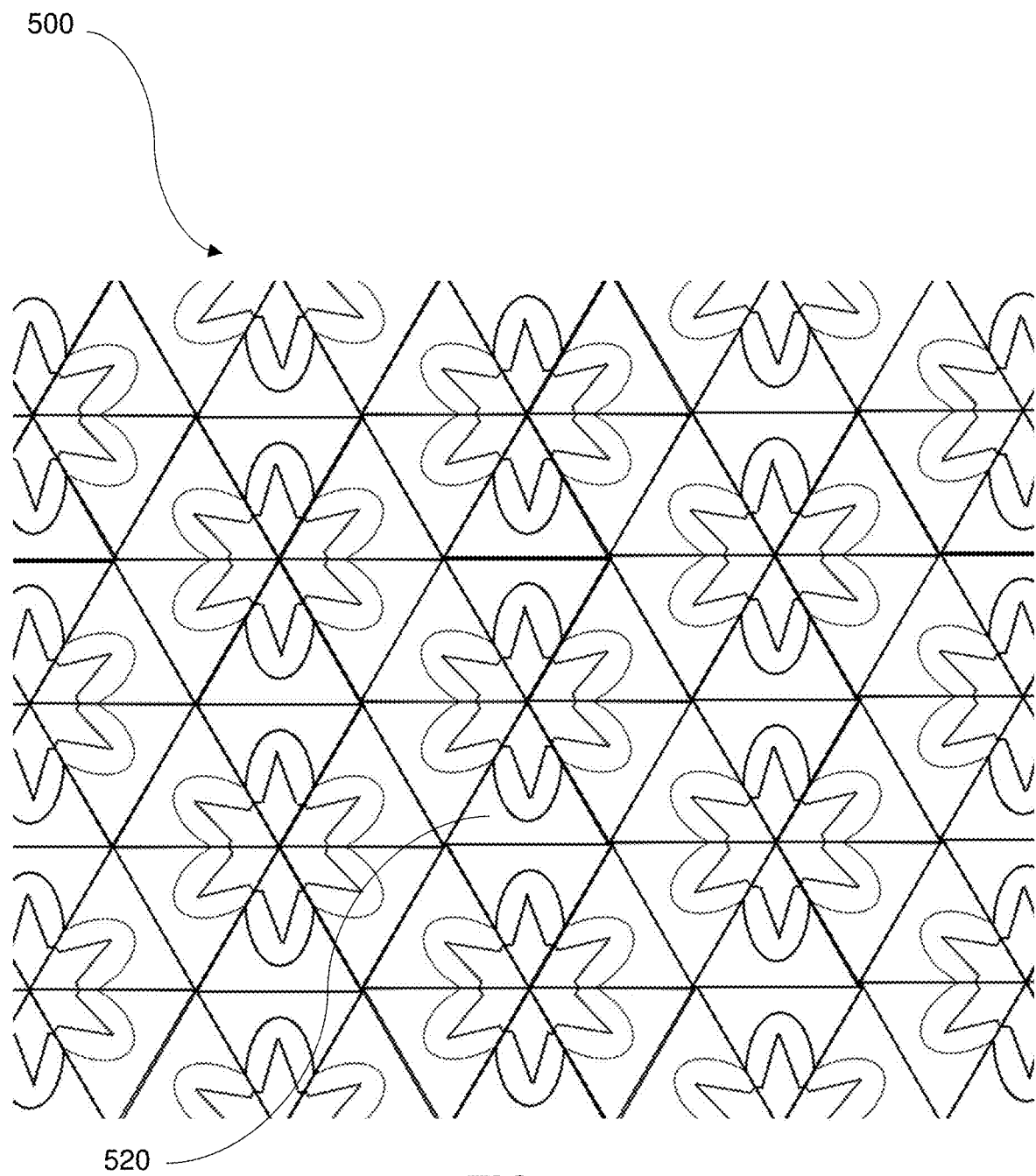
FIG. 5 illustrates an example of a repeating image pattern that may be generated using kaleidoscope system accordance with the teachings of the present disclosure.
Figure 6:
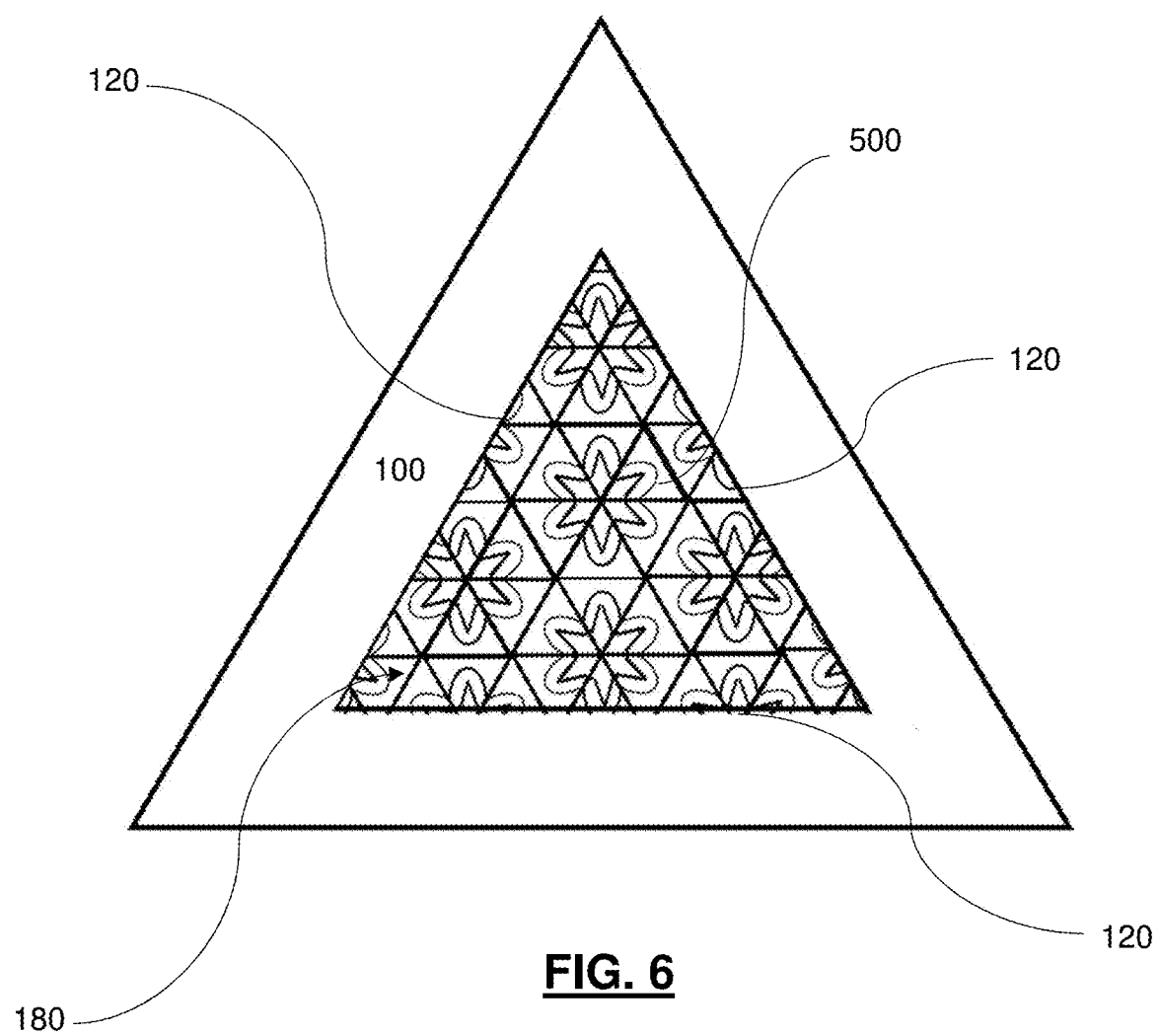
FIG. 6 illustrates a view of the image pattern of FIG. 5 as viewable through the front end of a kaleidoscope system accordance with the teachings of the present disclosure.

The particular warping of an image presented at the second end of bore 180 into a distorted pattern 500 made by the kaleidoscope system 100 depends on the geometry of the kaleidoscope 100. Where the reflective surfaces 120 are generally planar, regularly repeating patterns may be present. FIG. 5 depicts an illustrative example of a system with a bore 180, as in FIGS. 1-4, with a generally triangular cross-sectional shape, where the original image is the triangle portion 520 which is repeated in a hexagonal pattern created by the reflective surfaces 120. FIG. 6, depicts the user's view presented at the first end of the system 100 through first transparent viewer 440.

Figure 7A:
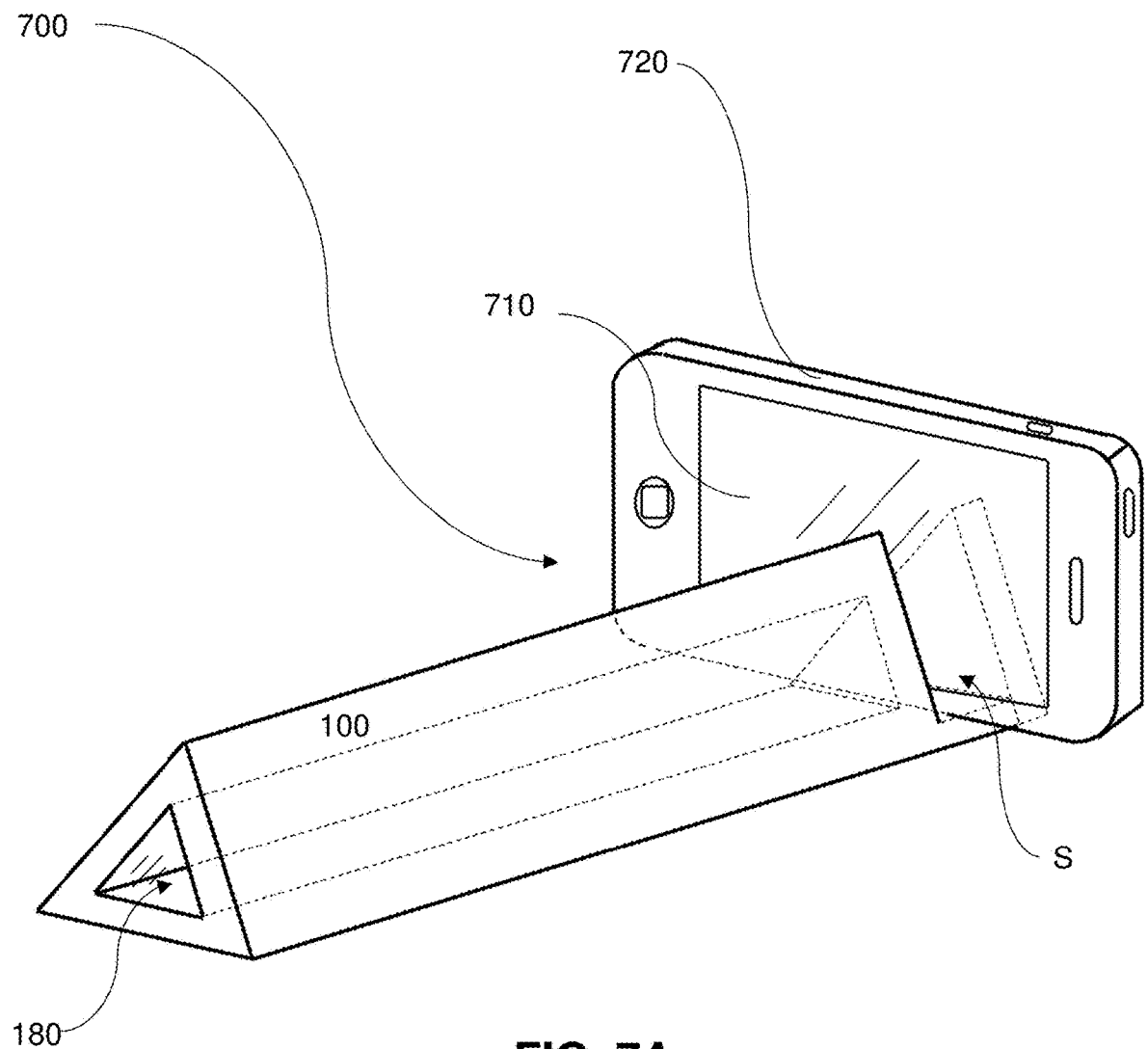
FIG. 7A illustrates a perspective view of the kaleidoscope system of FIG. 1 in use with a mobile device.

FIG. 7A depicts a mobile device 720 in position for use with the kaleidoscope system 100, with a display 710 facing the second end of bore 180, to allow the observer to view distorted images either through use of the camera on the mobile device 720, or another image displayed by the mobile device 720. As noted previously hereon, the mobile device 720 can be any suitable sized image producing device that can fit in the slot S. Some suitable devices may include smart phones, tablets, handheld gaming devices and the like. A viewer may then display a video or image on the device 720 and view it using the system 100.

Figure 7B:
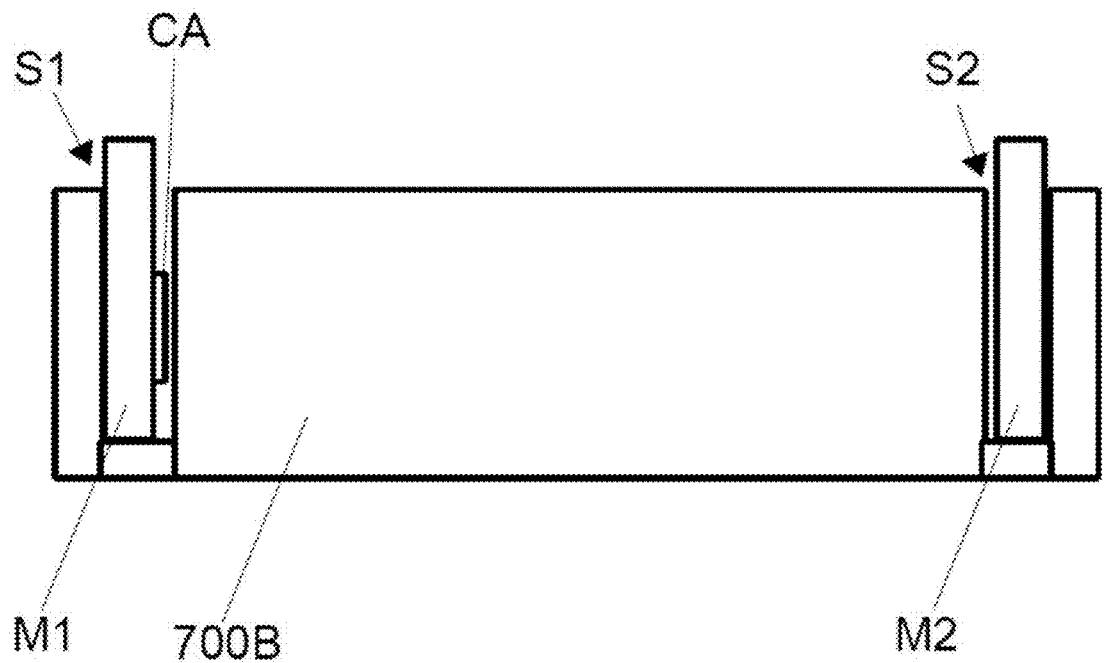
FIG. 7B illustrates a side view of a kaleidoscope system in accordance with the teachings of the present disclosure in use with two mobile devices.

It will be appreciated that a user may also place a mobile device 720 in the slot S such that the lens of a camera faces the second end of bore 180. The observer may then use the display of the device 720 to view the images formed by the system 100 using the first end of bore 180 as the input. The device 720 may then be used to capture images, such as distorted images of the surrounding environment. It will be appreciated that device 720 may then be used to record warped images generated through image sources supplied through the other end of the system, which could include a phone screen, a phone screen that is displaying what it is capturing through its camera lens, an object placed near the end, or the surrounding environment. In some embodiments, a system 700B, as shown in FIG. 7B with opposing slots S1 and S2 disposed on either end of the device which include counterpart shelves and backing members are contemplated within the present disclosure, which allow the lens CA of a camera of a first mobile device M1 to face one end and the screen on a second mobile device M2 to face the other end such that images may be generated by one mobile device and reacted by another. Additionally, a system 100 with a removeable strap or elastic cord that can be used to secure a second mobile device to the first end without the need for an opposite slot may also be used.

Figure 8:
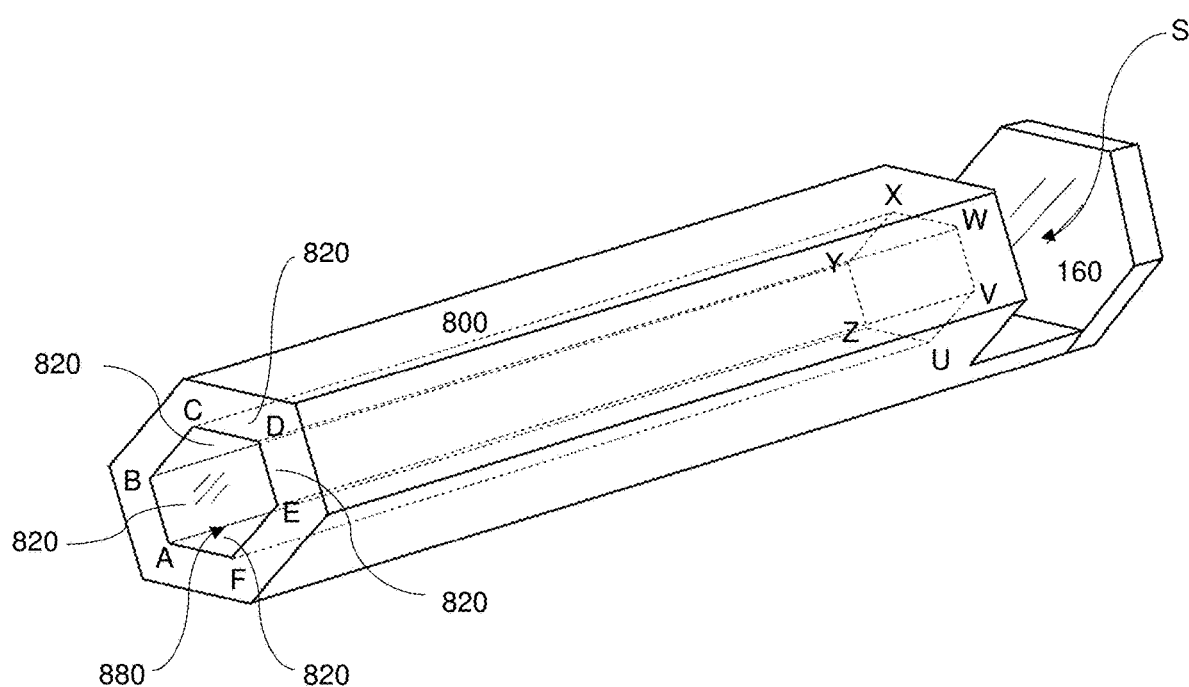
FIGS. 8, 9, and 10 illustrate perspective views of kaleidoscope systems in accordance with the teachings of the present disclosure having different cross-sectional shaped bores.
Figure 9:
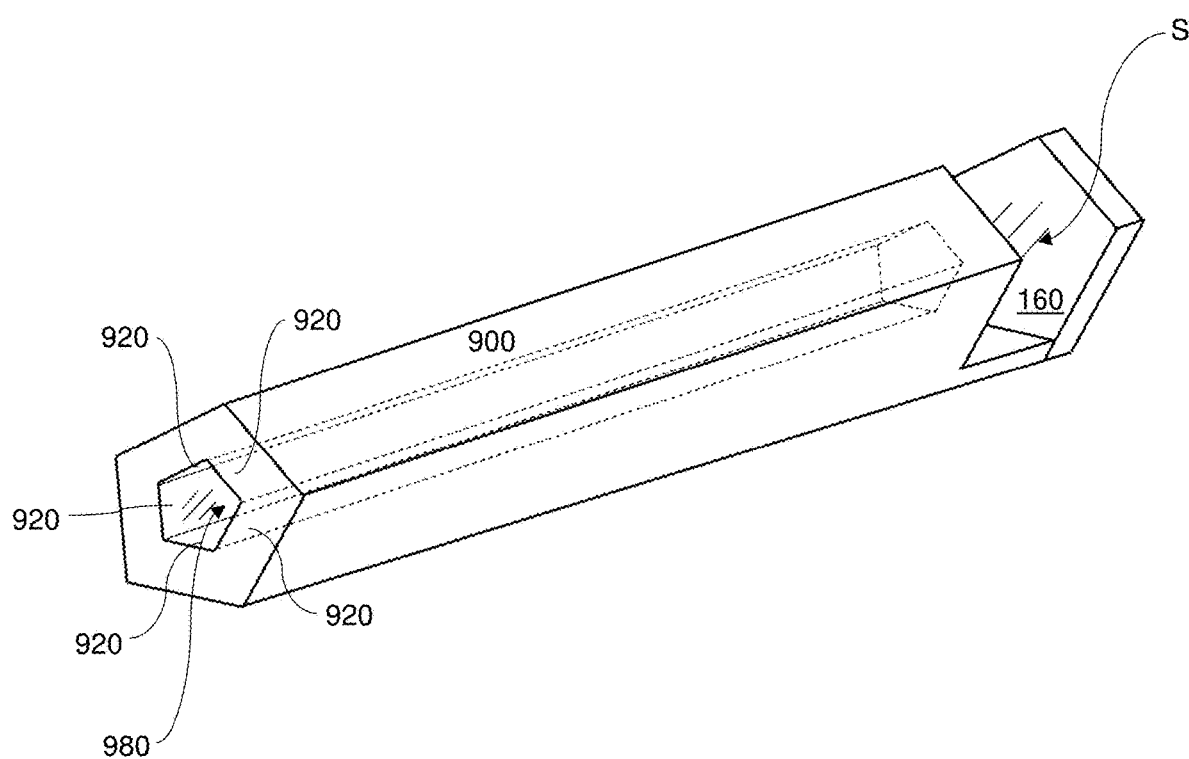
Figure 10:
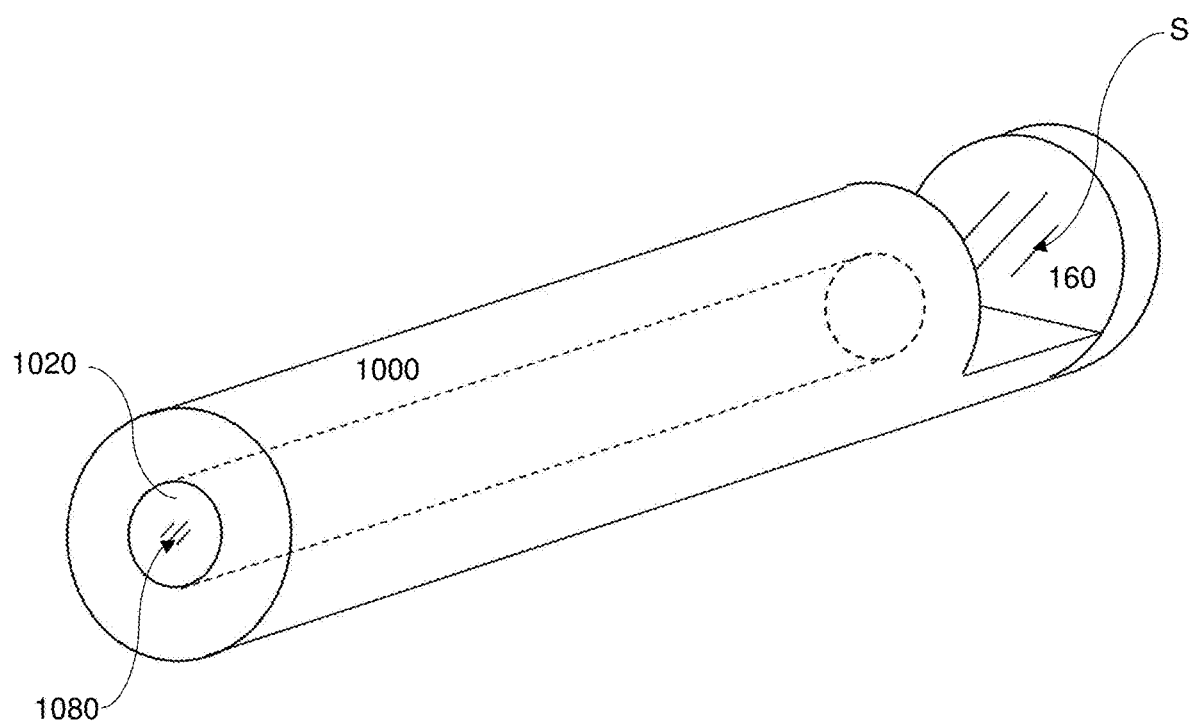
Figure 13:
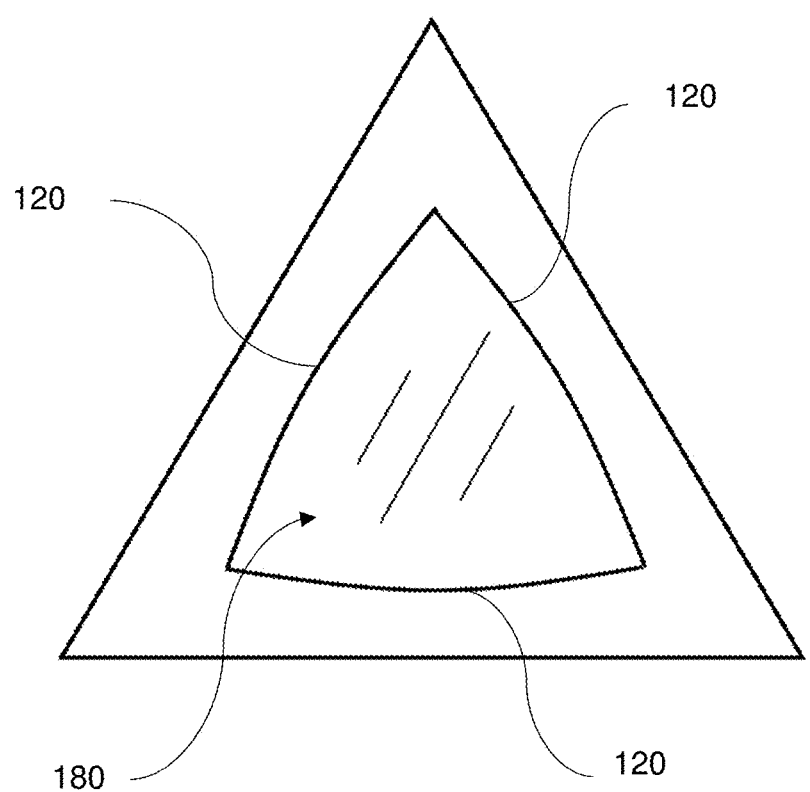
FIG. 13 illustrates a front view of a particular illustrative embodiment of a kaleidoscope system in accordance with the present disclosure.

FIGS. 8-10 illustrate kaleidoscope systems 800, 900 and 1000 with differing geometrical cross-sectional shapes for their respective bores 880, 980, 1080. It will be appreciated that the cross-sectional shape of the longitudinal bore may vary. FIG. 8 shows an embodiment with a hexagonal tube, FIG. 9 shows an embodiment with a pentagonal tube, and FIG. 10 shows an embodiment with a cylindrical tube. It will be appreciated that other polygonal, non-polygonal, and even irregular cross-sectional shapes may be used for the bore to create a number of different image distortion patterns. Some systems may use a variety of pluralities of reflective surfaces 120 housed in bore 180, which may include of the kaleidoscope 100 defined between a front end and a back end. The reflective surfaces 120 are disposed on the sides of the bore 180. The reflective surfaces 120 may be planar surfaces or curved surfaces 1220 which each produce differing styles of distorted images. For example, FIG. 13 depict the first end of a system 1300 where the bore 1380 and reflective surfaces 1020 disposed therein are non-planar. Embodiments with non-planar reflective surfaces may produce warped images have differing patterns and effects.

Figure 11:
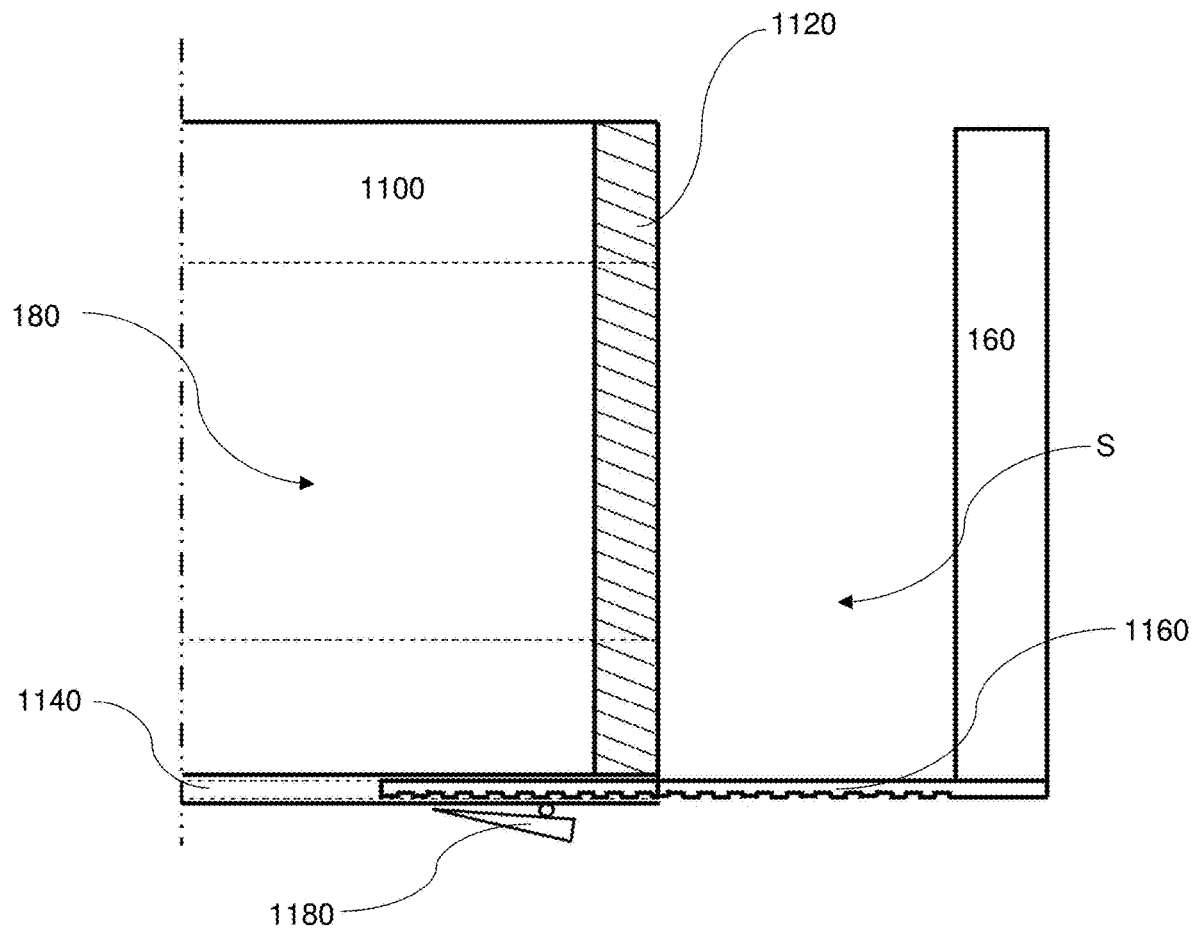
FIG. 11 illustrates a side view of another illustrative example of a clamping mechanism on a distal end of a kaleidoscope system in accordance with the present disclosure adapted for using a mobile device.

FIGS. 11 and 12 depict systems 1100 and 1200 with differing mechanisms for securing a mobile device 720 to the systems, and/or to remove backing member 160 for cleaning for use of the system without the backing member 160.

In the system 1100 of FIG. 11, the backing member 160 may be connected to a shelf 1160 formed as a slider member which can slide in or out of a hollow opening 1140 disposed in the body of system 11000 below the bore 180. A locking mechanism 1180 can be used to lock the slider member 1160 in place. The locking mechanism 1180 can be any suitable mechanism to secure the slider member 1160 at a desired position. In the depicted embodiment, a hinged member has a tab that may be abuttably inserted into a slot on the slider member 1160.

Figure 12A:
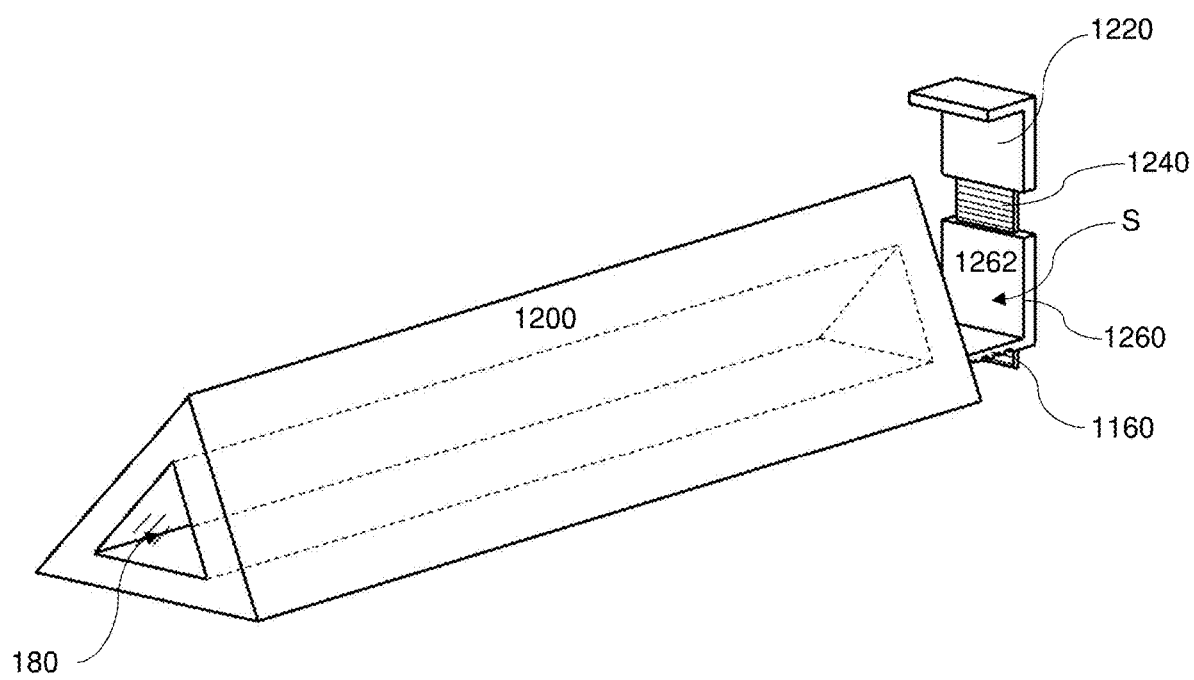
FIGS. 12A and 12B illustrate a perspective views of an illustrative examples of clamping mechanisms on a distal end of a kaleidoscope system in accordance with the present disclosure.
Figure 12B:
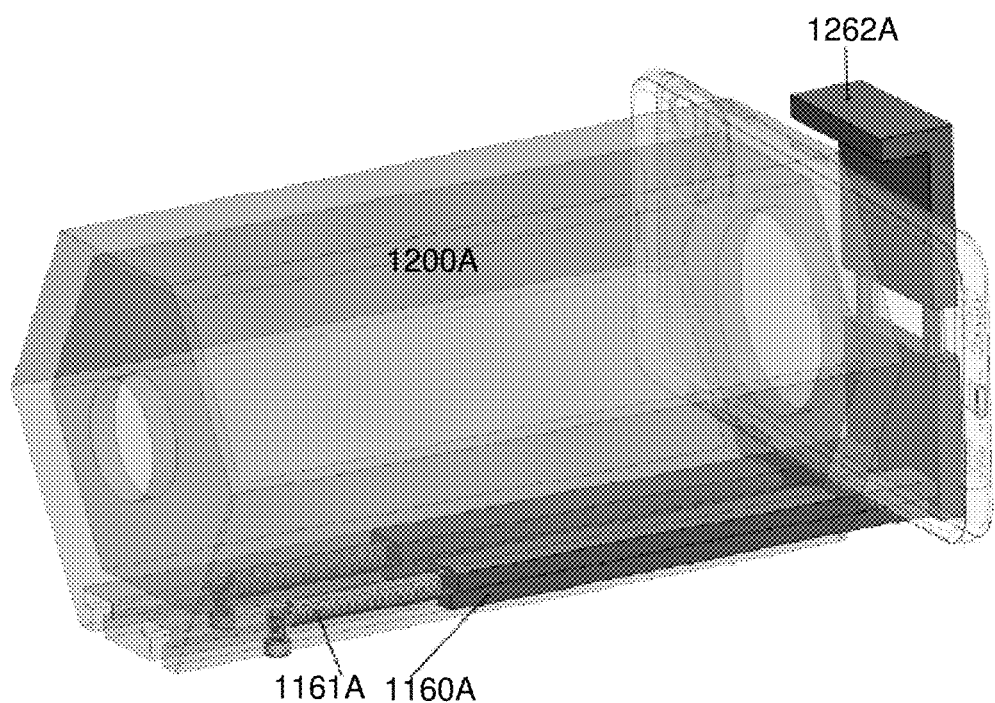

As depicted in FIG. 12A, in addition to slider member 1160, a backing member 1260 may be formed as a clamping device including a top clamp 1220 formed as a generally L-shaped member, a lower portion 1260 formed as a slider member operating similarly to slider 1160 of FIG. 11 with an upwardly extending rear wall 1262 aligned top clamp 1220. Top clamp 1220 and the lower portion 1260 may be joined by a vertical slider member 1240 that slides through a hollow opening in the clamp base 1260. The combination of sliding horizontally and vertically allows for a variation of mobile devices 720 and their varying dimensions, thicknesses, heights and widths. As depicted in FIG. 12B, a slider member 1160A may be attached using one or more resilient members, such as springs 1161A that draw the slider member forwards to secure a mobile device in the slot S.

FIG. 11 additionally shows a layer 1120 of a suitable material disposed at the distal end of body around bore 180 to prevent damaging the screen of the mobile device 720 or to create a seal between the screen of the mobile device 720 and the image end of the bore. This layer may prevent outside light from entering and tampering with the desired warped image, protect a display of the mobile device from scratching or allow for a more secure connection. The material 1120 may be suitably soft or resilient, such as a textile, neoprene rubbers, or a compressible foam.

Figure 14:
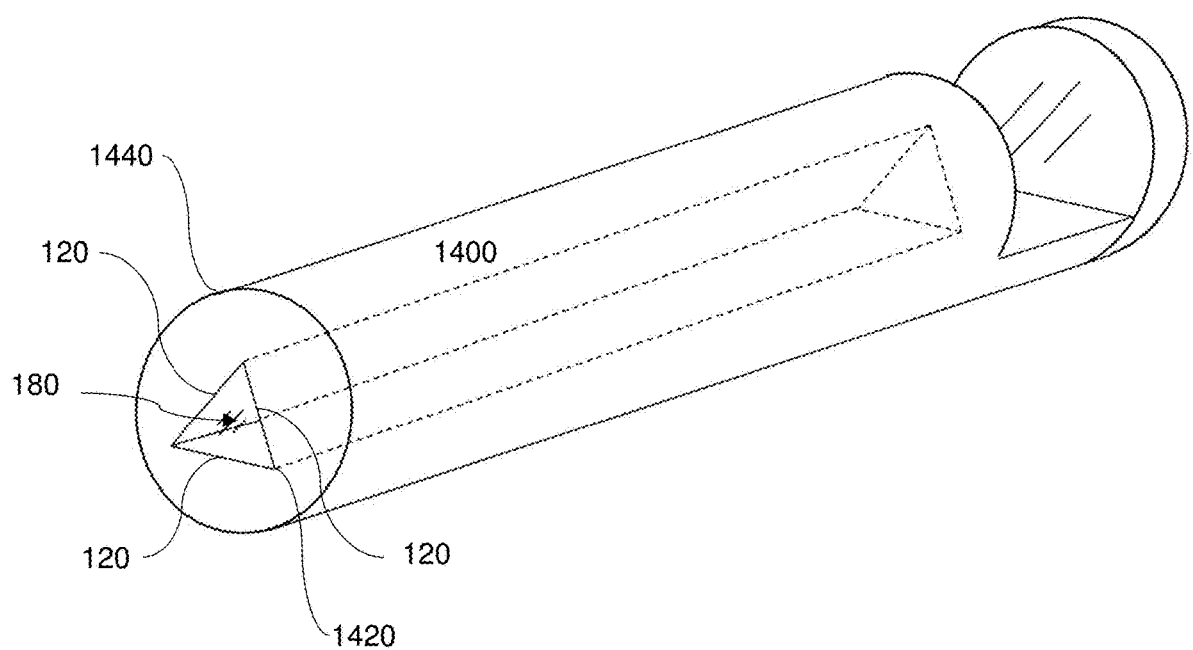
FIG. 14 illustrates a perspective view of an illustrative embodiment of a multiuse kaleidoscope system in accordance with the present disclosure.

It will be appreciated that the geometry of the exterior a kaleidoscope system in accordance with the present disclosure does not need to be the same geometric shape as that of the bore 180. FIG. 14. depicts such an embodiment where the exterior 1440 of the kaleidoscope system 1400 varies from that of the bore 180. It will be further appreciated that various components of the kaleidoscope systems can be constructed from any suitable materials, including, plastics, metals, glass, wood, composites, and various combinations thereof.

It will be further appreciated that the present disclosure includes methods associated with multi-use kaleidoscope systems and assemblies, including the setting up and viewing of images therethrough from differing sources, reconfiguring the system for different image sources and/or reconfiguring the system and a mobile device for either the generation of images or the capturing and recording of created images.

While this disclosure has been described using certain embodiments, it can be further modified while keeping within its spirit and scope. This application is therefore intended to cover any variations, uses, or adaptations of the disclosure using its general principles. Further, this application is intended to cover such departures from the present disclosure as come within known or customary practices in the art to which it pertains, and which fall within the limits of the appended claims.

What is claimed is:

1. A multiuse kaleidoscope system for warping images for viewing, comprising
    a body comprising a tube having a bore defined by an internal sidewall extending from a first end to a second end, wherein the internal sidewall defines a reflective surface;
    a first slot disposed at the second end of the bore, the first slot including a first shelf member extending from the body in a direction parallel to a long axis of the tube, and a first backing member attached to the first shelf member, the first backing member extending in a direction generally orthogonal to the long axis of the tube in a securing position to define the first slot; and
    a securing member attached to the backing member for securing a mobile device within the slot, the securing member bearing an image for creating warped images for visualization.

2. The kaleidoscope system of claim 1, wherein the first backing member is sufficiently transparent to allow visualization of images therethrough.

3. The kaleidoscope system of claim 1, wherein the securing member comprises an image source contact member having a planar surface facing the second end of the body that is disposed on a shaft extending through the first backing member.

4. The kaleidoscope system of claim 3, wherein the planar face of the image source contact member bears the image for creating warped images for visualization.

5. The kaleidoscope system of claim 4, wherein the image source contact member is detachable.

6. The kaleidoscope system of claim 1, further comprising a second slot disposed at a first end of the bore, the second slot including a second shelf member extending from the body in a direction parallel to a long axis of the tube, and a second backing member attached to the second shelf member, the second backing member extending in a direction generally orthogonal to the long axis of the tube in a securing position to define the second slot.

7. The kaleidoscope system of claim 1, wherein the securing member comprises a clamp formed in the first backing member.

8. The kaleidoscope system of claim 1, wherein the first backing member is pivotally attached to the first shelf member, such that the first backing member may be rotated from the securing position to an open position.

9. The kaleidoscope system of claim 1, wherein the first shelf member slidably extends into a channel in the body.

10. The kaleidoscope system of claim 9, wherein the first shelf member is attached to the body by at least a first resilient member that draws the backing member towards the body.

11. A multiuse kaleidoscope system for generating warped images for viewing, comprising
  a body comprising a tube having a bore defined by an internal sidewall extending from a first end to a second end, wherein the internal sidewall defines a reflective surface;
  a first slot disposed at the second end of the bore, the first slot including
    a first shelf member extending from the body in a direction parallel to a long axis of the tube,
    a first backing member attached to the first shelf member, the first backing member extending in a direction generally orthogonal to the long axis of the tube in a securing position to define the first slot; and being sufficiently transparent to allow visualization of images therethrough, and
    open sides.

12. The kaleidoscope system of claim 1, further comprising a securing member attached to the first backing member for securing a mobile device within the slot.

13. The kaleidoscope system of claim 12, wherein the securing member comprises an image source contact member having a planar surface facing the second end of the body that is disposed on a shaft extending through the first backing member.

14. The kaleidoscope system of claim 13, wherein the shaft is threaded.

15. The kaleidoscope system of claim 13, wherein the planar face of the image source contact member bears an image for creating warped images for visualization.

16. The kaleidoscope system of claim 15, further comprising
  a second slot disposed at the first of the bore, the first second including
    a second shelf member extending from the body in a direction parallel to a long axis of the tube, and
    a second backing member attached to the second shelf member, the second backing member extending in a direction generally orthogonal to the long axis of the tube in a securing position to define the second slot.

17. The kaleidoscope system of claim 13, wherein the securing member comprises a clamp formed in the first backing member.

18. The kaleidoscope system of claim 11, wherein the first backing member is pivotally attached to the first shelf member, such that the first backing member may be rotated from the securing position to an open position.

19. The kaleidoscope system of claim 18, further comprising a locking member that secures the first backing member in the securing position when actuated.

20. The kaleidoscope system of claim 11, wherein the first shelf member slidably extends into a channel in the body and is attached by at least a first resilient member that draws the first backing member towards the body.

* * * * *